J. SCHLEINZER.
OPTICAL INSTRUMENT.
APPLICATION FILED JULY 30, 1917.

1,267,596.

Patented May 28, 1918.

INVENTOR:
John Schleinzer
by Davis & Simms
his attorneys

UNITED STATES PATENT OFFICE.

JOHN SCHLEINZER, OF ROCHESTER, NEW YORK, ASSIGNOR TO CROWN OPTICAL COMPANY, OF ROCHESTER, NEW YORK, A CORPORATION.

OPTICAL INSTRUMENT.

1,267,596.  Specification of Letters Patent.  Patented May 28, 1918.

Application filed July 30, 1917. Serial No. 183,614.

*To all whom it may concern:*

Be it known that I, JOHN SCHLEINZER, a citizen of the United States, and resident of Rochester, in the county of Monroe and State of New York, have invented certain new and useful Improvements in Optical Instruments, of which the following is a specification.

The present invention relates to optical instruments, and more particularly to the type in which a diopter ring is adjustably mounted with relation to the eye-piece carrier, in order that the zero mark of its graduations may be shifted with relation to the eye-piece carrier, so as to aline with the index or pointer on a stationary part of the instrument when the eye-piece is adjusted for infinity, an object of this invention being to provide an interlocking connection between the diopter ring and the part by which it is carried, whereby the operation to lock the diopter ring, after its adjustment with relation to the eye-piece carrier is made, is obviated.

To this and other ends, the invention consists of certain parts and combinations of parts all of which will be hereinafter described, the novel features being pointed out in the appended claims.

In the drawings:—

Figure 1:
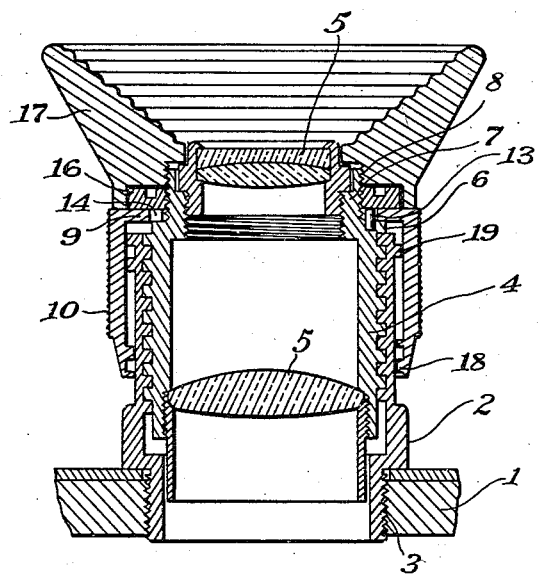
Figure 1 is a vertical section through an optical instrument embodying the present invention.
Figure 2:
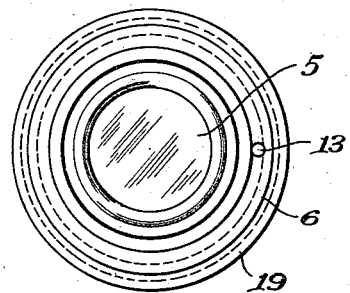
Fig. 2 is a view of the eye-piece with the eye-cap removed.
Figure 3:
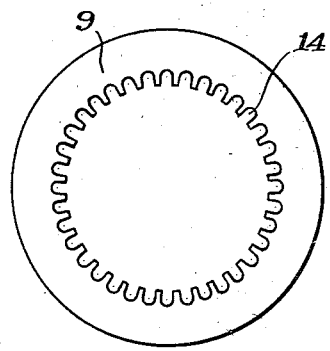
Fig. 3 is a top view of the diopter ring.
Figure 4:
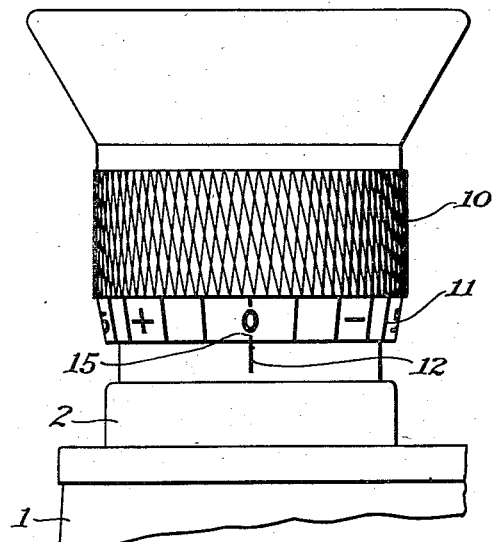
Fig. 4 is a view, showing the relation of the diopter ring to the index on the stationary part.

In optical instruments, and especially binocular telescopes, it is customary to place the index or pointer for the eye-piece adjustment upon a stationary part which is connected to the instrument by a screw thread. By reason of this screw-thread connection, the index or pointer is not marked on the stationary part until after such part has been connected to the instrument, for the reason that it is desirable that the index shall always be arranged in a definite position with reference to the instrument as a whole, and this position cannot be secured until after the stationary part has been attached, owing to the screw thread connection. After the stationary part has been attached, and the index mark thereon is in its proper position, the eye-piece carrier is adjusted so that the eye-piece is positioned at its infinity point, after which the diopter ring or ring on which the graduations of the eye-piece adjustment are arranged is adjusted with reference to the eye-piece, so that the zero point will aline with the point or index of the stationary part. In this position, the diopter ring is secured to the eye-piece carrier by a screw or rivet, but the openings for this screw or rivet are not made until after the adjusted position of the diopter ring is found, and, as a consequence, the openings for this screw or rivet vary in different instruments and require individual selection, thus adding to the cost of manufacture of the optical instrument.

According to this invention, this individual selecting of the openings for the screw or rivet for the diopter ring of each optical instrument is eliminated, and in place thereof there is provided an interlocking connection between the diopter ring and the part by which it is carried, which may be made the same upon all instruments, so that the coöperating parts of the interlocking means may be formed in jigs or special tools before the diopter ring is connected to the part by which it is carried, this arrangement making it possible to assemble the instrument by unskilled labor, so that the cost of manufacturing the instrument is reduced.

Referring more particularly to the drawings, 1 indicates the casing of a binocular, only a portion of which is shown. In this casing, a stationary sleeve 2 is secured by screw threads 3. The stationary tube or sleeve is internally threaded and is engaged by external threads upon an eye-piece carrier 4, the latter having eye-piece lenses 5 of any desired construction and arrangement. The screw-threaded connection between the eye-piece carrier and the stationary sleeve 2 permits the adjustment of the eye-piece in the direction of the optical axis of the instrument. The eye-piece carrier 4 has an external shoulder 6 near its outer end, the carrier being reduced at 7 beyond said shoulder and externally threaded at 8. The shoulder 6 serves as an abutment or rest for a flange 9 on the diopter ring 10, said ring having the usual graduations 11 for coöperation with the index or pointer 12 on the stationary sleeve 2.

The interlocking connection between the diopter ring and the eye-piece carrier or part by which the diopter ring is carried is formed preferably by a projection or point 13 on one of said parts, in this instance, on the eye-piece carrier 4 for engagement within any one of the pockets or recesses 14 formed on the periphery of the flange 9. It is apparent that with this arrangement, after the index 12 has been formed on the stationary tube or sleeve 2, and the eye-piece carrier has been adjusted axially, to its infinity point, the diopter ring may be turned or adjusted with reference to the eye-piece carrier until the zero mark 15 on the diopter ring is caused to register with the index 12. At this point, the projection 13 is caused to enter that one of the notches or recesses 14 which is nearest to the projection, thus locking the diopter ring against turning with reference to the eye-piece carrier 4. Any suitable means may be employed for holding the diopter ring in engagement with the projection 13, but in this instance it is preferred to use a ring 16 engaging the threads 8 on the eye-piece and pressing the flange 9 against the shoulder 6. The ring 16 may be housed within the eye-cap 17 which may also be secured to the threads 8 of the eye-piece carrier.

Axial movement of the eye-piece carrier on the stationary sleeve or tube 2 may be limited by internal screw threads 18 on the diopter ring engaging external screw threads 19 on the stationary sleeve or tube 2, these threads being out of engagement during the normal operation of the eye-piece, and acting as coöperating stops to limit the outward movement of the eye-piece. Disengagement between the diopter ring and the stationary sleeve or tube 2 is effected by disconnecting the diopter ring 10 from its eye-piece carrier, and then causing engagement between the screw threads 18 and 19 to permit the diopter ring 10 to feed off the stationary tube or sleeve 2.

From the foregoing it will be seen that there has been provided a diopter ring adjustment which provides interlocking connection between the diopter ring and the part by which it is carried, said connection being so formed that individual selection of the positions for the interlocking parts is unnecessary, said parts being formed alike on all instruments. This invention obviates the necessity of the employment of skilled labor in the assembling of this part of the instrument, and thus reduces the cost of manufacture.

What I claim as my invention and desire to secure by Letters Patent is:

1. In combination with the stationary sleeve carrying an index, of an eye-piece carrier adjustable axially of said sleeve, and a diopter ring for coöperation with the index, carried by the eye-piece carrier, one of the last two named parts having an annular series of recesses and the other part having a projection adapted to enter any one of said recesses to lock the two parts together.

2. In combination with a casing, a sleeve having screw-threaded connection with said casing and provided with an index, an eye-piece carrier adjustable axially in said sleeve, a diopter ring carried by said eye-piece carrier for coöperation with the index, an interlocking connection between the diopter ring and the eye-piece carrier comprising a projection on one of said parts, the other of said parts having an annular series of recesses any one of which is adapted to receive said projection to lock the parts together.

3. In combination with a stationary sleeve carrying an index, an eye-piece carrier adjustable axially in said sleeve and provided with a shoulder, a diopter ring for coöperation with the index having a flange resting against said shoulder and provided with a plurality of recesses, and a projection on the eye-piece carrier arranged to enter any one of said recesses to lock the diopter ring in its adjusted position with reference to the eye-piece carrier.

4. In combination with a casing, a stationary sleeve having screw-threaded connection with said casing and provided with an index, an eye-piece carrier adjustable axially in said sleeve and provided with an annular shoulder, a diopter ring having a flange engaging said shoulder, said ring being adapted to coöperate with the index, and the flange being provided with an annular series of recesses, a projection on the eye-piece carrier arranged to enter any one of said recesses to lock the diopter ring against turning with reference to the eye-piece carrier, and a clamping ring engaging said flange on the diopter ring to hold the latter in engagement with said projection.

JOHN SCHLEINZER.